(12) United States Patent
Bak et al.

(10) Patent No.: US 6,705,838 B1
(45) Date of Patent: Mar. 16, 2004

(54) MODIFIED WIND TURBINE AIRFOIL

(75) Inventors: Dan Christian Bak, Copenhagen (DK); Peter Fuglsang, Roskilde (DK)

(73) Assignee: Forskningscenter Riso, Roskilde (DK)

( * ) Notice: Subject to any disclaimer, the term of this patent is extended or adjusted under 35 U.S.C. 154(b) by 0 days.

(21) Appl. No.: 10/069,286

(22) PCT Filed: Aug. 25, 2000

(86) PCT No.: PCT/DK00/00472

§ 371 (c)(1),
(2), (4) Date: May 8, 2002

(87) PCT Pub. No.: WO01/14740

PCT Pub. Date: Mar. 1, 2001

(30) Foreign Application Priority Data

Aug. 25, 1999 (DK) .......................................... 1998 01180

(51) Int. Cl.$^7$ .......................... F03D 11/00; B64C 27/467
(52) U.S. Cl. ................................. 416/243; 416/DIG. 2; 416/DIG. 5
(58) Field of Search .......................... 416/243, DIG. 2, 416/DIG. 5

(56) References Cited

U.S. PATENT DOCUMENTS

| 3,946,688 | A | * | 3/1976 | Gornstein et al. | 114/274 |
|---|---|---|---|---|---|
| 4,692,098 | A | | 9/1987 | Razinsky et al. | 416/223 |
| 5,299,909 | A | * | 4/1994 | Wulf | 415/186 |
| 5,562,420 | A | | 10/1996 | Tangler et al. | 416/223 |

FOREIGN PATENT DOCUMENTS

| WO | WO 96/16252 | 5/1996 |
|---|---|---|
| WO | WO 98/22711 | 5/1998 |
| WO | WO 99/27252 | 6/1999 |

OTHER PUBLICATIONS

W.A. Newson et al., "Effects of Wing–Leading–Edge Modifications on a Full–Scale, Low–Wing General Aviation Airplane", NASA Technical Paper 2011, pp. 1–104.
H.M. Ross et al., "Wing Leading–Edge Droop/Slot Modification for Stall Departure Resistance", NASA Technical Paper, pp 436–443.
Fuglsang et al., "Design of the New RISØ–A1 Airfoil Family For Wind Turbines", EWEC'99, Nice, France, pp 1–4.
Fuglsang et al., "Multipoint Optimization of Thick High Lift Airfoil For Wind Turbines", EWEC'97, Dublin, Ireland, pp 1–4.
Bak et al., "Double Stall", Risø National Laboratory, Roskilde, Jun. 1998, pp. 1–32.
Madsen et al., "The Phenomenon of Double Stall", Proceedings of the International Conference, Dublin Castle, Ireland, Oct. 1997 pp 453–457.

(List continued on next page.)

Primary Examiner—Ninh H. Nguyen
(74) Attorney, Agent, or Firm—Harness, Dickey & Pierce, P.L.C.

(57) ABSTRACT

The present invention relates in a broad aspect to a method for design and modification of airfoils useful for wind turbine applications, which airfoils possess smooth and stable characteristics in stall. These characteristics comprise: (1) No or very little tendency to double stall, (2) Insensitivity or little sensitivity of maximum lift to leading edge roughness, (3) High lift-drag ratio just before maximum lift, (4) Small variations of the aerodynamic loads in stall and (5) Sufficient aerodynamic damping to suppress blade vibrations in stall. The invention further relates to blades and/or airfoil sections in general which posses smooth and stabile characteristics in stall. Also, it relates to a method of implementing the desired shape on an airfoil or a wind turbine blade.

38 Claims, 5 Drawing Sheets

OTHER PUBLICATIONS

Bak et al., "Observations and Hypothesis of Double Stall", Wind Energy 2, 195–210 (1999) pp 195–210.

Fuglsang et al., "Modification of the NACA 63–415 Leading Edge To Avoid Double Stall", IEA Joint Action, Aerodynamics of Wind Turbines 13$^{th}$ Symposium; Stockholm, Nov. 29–30, 1999.

Bak et al., "Wind Tunnel Tests of the NACA 63–415 and a Modified NACA 63–415 Airfoil", Risø National Laboratory, Roskilde, Dec. 2000, pp 1–109.

Bak et al., "Modification of the NACA $63_2$–415 Leading Edge For Better Aerodynamic Performance", 2001 ASME Wind Energy Symposium Technical Papers at the 39$^{th}$ AIAA Aerospace Sciences Meeting and Exhibit. Nemo, NV, Jan. 11–14, 2001, pp. 92–102.

Gonzalez et al., "An Experimental Study of Droop Leading Edge Modifications on High & Low Aspect Ratio Wings Up to 50° Angle of Attack", AIAA–93–3499–CP, 1993, pp 786–775.

Stough et al., "Wing Modification for Increased Spin Resistance", SAE Technical Paper Series 830720, Apr. 12–15, 1983.

Ross et al., "Tailoring Stall Characteristics Using Leading–Edge Droop Modifications", Journal of Aircraft, vol. 31, No. 4, Jul.–Aug. 1994, pp766–773.

Staff, Langley Research Center, "Exploratory study of the effects of Wing–Leading–Edge Modifications on the Stall/Spin Behavior of a Light General Aviation Airplane", NASA TP–1589, 1979.

Newsom et al., "Effects of Wing–Leading–Edge Modifications on a Full–Scale, Low–Wing General Aviation Airplane–Wind–Tunnel Investigation of High–Angle–of Attack Aerodynamic Characteristics", NASA TP–2011, 1982.

Muri et al., "Wind–Tunnel Investigation of a Full–Scale General Aviation Airplane Equipped With an Advanced Natural Laminar Flow Wing", NASA TP–2722, 1987.

Wortman et al., "Messungen an drei Flugelprofilen des Segelflugezeuges Ka 6", Vortrag am 8. OSTIV–Kongress, Jun. 1960, Kohn (and rough English translation).

Ross et al., "Tailoring Stall Characteristics Using Leading–Edge Droop Modifications", Journal of Aircraft, Vo., 31, No. 4, Jul.–Aug., 1994.

Stough et al., "Wing Modification for Increased Spin Resistance", Proc. Business Aircraft Meeting & Exposition, Wichita, Kanasa, Apr. 12–15, 1983.

Gonzalez et al., "An Experimental Study of Droop Leading Edge Modifications on High & Low Aspect Ratio Wings Up to 50° Angle of Attack", AIAA paper 93–3496–CP, Proc. AIAA Applied Aerodynamics Conference, 11$^{th}$, Monterey, CA, Aug. 9–11, 1993, p. 774–786.

Stough et al., "Flight Investigation of the Effects of an Outboard Wing–Leading–Edge Modification on Stall/spin Characteristics of a Low–Wing, Single–Engine, T–Tail Light Airplane", NASA TP–2691, Jul. 1987.

Allison et al., Airfoil Modification Effects on Subsonic and Transoic Pressure Distributions and Performance for the EA–6B Airplane, NASA TP–3516, May 1995, pp. 84.

Berak, "Aerodynamic modification of MS airfoil sections", Zpravodaj VZLU Issue; 5, p. 253–267 Jan. 01, 1990 11. (abstract enclosed).

Hicks et al., "Effects of upper surface modification on the aerodynamic characteristics of the NACA 63 sub 2–215 airfoil section", NASA–TM–78503 A–7507, Jan. 01, 1979.

Hicks, et al., "Effects of forward contour modification on the aerodynamic characteristics of the NACA 641–212 airfoil section", NASA–TM–X–3293 A–6018, Sep. 01, 1975.

Render, "An experimental investigation into effects of modifying the trailing edge geometry of a Wortman FX63–137 aerfoil", Remotely piloted vehicles; Interantional conference, 4$^{th}$ Bristol, England, Apr. 9–11, 1984, Proceedings (A86–10351 01–01). Bristol, University of Bristol, 1984, p. 15.1–15.13.

Harris et al., "Wind–tunnel investigation of effects of rear upper surface modification on a NASA supercritical airfoil", NASA–TM–X–2454 L–7983 NAS 1.15:X2454, Jan. 01, 1972.

Hoad, "An experimental investigation of the effect of rotor tip shape on helicopter blade–slap noise", NASA–TM–80066, May 01, 1979.

Holdaway et al., Effects of Outboard Thickened and Blunted Leading Edges in the Wave Drag of a 45 Degree Swept–Wing and Body Combination, NASA–TM–x–27, Aug. 01, 1959.

Graham, "Investigation of the effects of an airfoil section modification on the aerdynamic characteristics at subsonic and supersonic speeds of a thin swept wing of aspect ratio 3 in combination with a body", NACA RM–A55D11, Jun. 28, 1955, pp 47.

Betz, "Modification of wing–section shape to assure a predetermined change in pressure distrubution", NACA Technical Memorandum 767, 1935, pp. 21.

Greenhalg et al., "Aerodynamic properties of a two dimensional inextensible flexible airfoil", AIAA Paper 83–1796, American Institute of Aeronautics and Astronautics, Applied Aerodynamics Conference, Danvers, MA, Jul. 13–15, 1983, 9p.

Roa, "Variable camber wings for transport aircraft", Cranfield Inst. of Tech., Bedford, United Kingdom, Jan. 01, 1989.

Streather, "Variable geometry aerofoils as applied to the Beatty B–5 and B–6 sailplanes", International Council of the Aeronautical Sciences, Congress, 13$^{th}$ and AIAA Aircraft Systems and Technology Conference, Seattle, WA, Aug. 22–27, 1982, Proceedings. Vol. 2. (A82–40876 20–01) New York, American Institute of Aeronautics and Astronautics, 1982, p. 922–930. Interantaional Council of the Aeronautical Science Seattle, WA Aug. 22–27, 1982.

* cited by examiner

MODIFIED WIND TURBINE AIRFOIL

The present invention relates in a broad aspect to a method for design and modification of airfoils useful for wind turbine applications, which airfoils possess smooth and stable characteristics in stall. These characteristics comprise: (1) No or very little tendency to double stall, (2) Insensitivity or little sensitivity of maximum lift to leading edge roughness, (3) High lift-drag ratio just before maximumlift, (4) Small variations of the aerodynamic loads in stall and (5) Sufficient aerodynamic damping to suppress blade vibrations in stall. The invention further relates to blades and/or airfoil sections in general which posses smooth and stabile characteristics in stall. Also, it relates to a method of implementing the desired shape on an airfoil or a wind turbine blade.

BACKGROUND FOR THE INVENTION AND INTRODUCTION TO THE INVENTION

An increasing problem at least within the wind turbine industry is poor power quality, high fatigue loads and unreliability of power and loads for wind turbines operating at high wind speeds where the airfoil sections or blades are just before or in stall.

The airfoil sections on the blades operate at angles of attack ranging from low angles of attack, where the lift is low on the linear part of the lift versus angle of attack curve, to high angles of attack where the airfoil section is just before stall or in stall. This is in contrast to other traditional aviation applications such as aeroplanes and helicopters. Especially operation in stall is unique for some wind turbines, which use stall as a way of controlling the peak power which is also called the rated power.

The following parameters influence the operation in stall:

DOUBLE STALL

Double stall denotes the situation wherein the flow past an airfoil section or blade having an angle of attack relative to the free stream flow shows at least two levels of lift and drag to the same angle of attack.

The problem becomes even larger when a wind turbine is operating in stall regulated mode, i.e. the power of the turbine is limited by stall on the blades and the lift and drag produced by the blade or airfoil section may jump between at least two levels showing at least two levels in generated power and/or thrust on the rotor. When the power jumps from on level to another the aerodynamic forces acting on the blade or airfoil section dramatically changes. This may cause uncertainties of the power level and thereby uncertainties in the prediction of the energy production. Furthermore, large vibrations induced in the turbine may be the result which at the end may cause break down of the turbine.

LEADING EDGE ROUGHNESS

Leading edge roughness around maximum lift both at stall and in stall can appear when the leading edge part of the airfoil section or blade is accumulating bugs, dust, ice or other kind of material changing the roughness of the existing airfoil section or blade and the effective flow pattern around the airfoil section or blade.

Leading edge roughness around maximum lift both just before stall and in stall is often observed on wind turbines. It causes uncertainties of the power level and thereby uncertainties in the prediction of the energy production. Furthermore, the loads on the structure will change, which might result in undesirable structural dynamics.

LIFT-DRAG RATIO

The lift-drag ratio is a measure of the efficiency of the airfoil section or blade. The higher ratio the better efficiency. Thus, the lift-drag ratio can be improved by increasing the lift and/or decreasing the drag.

It is desirable that the lift-drag ratio just before stall is high. This is because maximum power of the wind turbine this way will be obtained at lower wind speeds and the annual energy production will increase.

VARIATION OF AERODYNAMIC LOADS

The variation of the aerodynamic loads can be measured as the standard deviation of the aerodynamic lift and drag. A high standard deviation of lift and drag means that the variation of the aerodynamic loads is high. Especially in stall the standard deviation can be high, indicating that the flow is not smooth and stable.

When operating in stall it is important that the variation of the aerodynamic loads is as small as possible. This is because the structure will respond on the aerodynamic loads. Thus, large variations in the loads will cause vibrations in the structure resulting in higher fatigue loads and more noise. Furthermore, the quality of the produced power may become poorer with larger variation in the aerodynamic loads. Very big variations in the loads are observed when double stall appears.

AERODYNAMIC DAMPING

The total damping of a wind turbine blade is the sum of the structural damping and the aerodynamic damping. Aerodynamic damping is a measure for how well the blade structure is damped when influenced by aerodynamic loads. Especially when operating under stalled conditions there is a risk for negative total damping. If the positive structural damping is less than the negative aerodynamic damping severe vibrations of the structure will appear possibly resulting in break down of the structure.

For wind turbines operating in high wind speeds vibrations of the blades both in the rotor plane and out of the rotor plane can occur. This is a very undesirable situation and can be avoided by changing the stall characteristics of the airfoils used for the blades.

Therefore a technical problem in connection with the above mentioned parameters influencing stall is to provide airfoil sections or blades wherein the risk of presence of double stall, significant influence of leading edge roughness, low lift-drag ratio just before stall and in stall, big variations of the aerodynamic loads and/or negative aerodynamic damping is minimised and in some cases avoided.

As many turbines today are utilising airfoil sections or blades producing double stall, big influence of leading edge roughness, low lift-drag ratio just before stall and in stall, big variations of the aerodynamic loads and/or negative aerodynamic damping a further problem is to modify these turbines, that is modify the blades of existing wind turbines or modify the existing moulds for airfoils and/or blades.

BRIEF DESCRIPTION OF THE INVENTION

These problems have been solved by means of the present invention, which provides two- or three-dimensional cross sectional airfoil data, such as airfoil sections or blades, useful for aerodynamic applications such as for a wind turbine, wherein the airfoil section contour or parts thereof or wherein the contour of the blade or parts thereof have been modified to avoid one or more of the problems listed below:

Generation of double stall, that is the flow past the airfoil section or blade shows at least two different lift and/or drag levels to the same angle of attack. According to several aspects of the present invention, aerodynamic airfoil sections or blades are designed which when exposed to a stream of fluid they do not have the tendency of generating a burst of a leading edge separation bubble as such a leading edge separation may be the source of double stall phenomena.

Sensitivity to leading edge roughness, that is where the airfoil shows a decrease in the lift and an increase in the drag just before stall and in stalled conditions when bugs, dust, ice or other pollutants accumulate at the leading edge part of the airfoil. According to several aspects of the present invention, aerodynamic airfoil sections or blades are designed which when exposed to a stream of fluid they show less sensitivity to leading edge roughness in stalled conditions.

Low lift-drag ratio at angles of attacks just before maximum lift, that is where the airfoil section or blade just before maximum lift shows a certain efficiency. According to several aspects of the present invention, aerodynamic airfoil sections or blades are designed which when exposed to a stream of fluid they show an increased lift-drag ratio at angles of attacks from just before maximum stall and until lift and thereby an increased efficiency in this angle of attack interval.

Big variations in the aerodynamic loads, that is where the airfoil in stalled conditions shows a certain standard deviation in lift and/or drag. According to several aspects of the present invention, aerodynamic airfoil sections or blades are designed which when exposed to a stream of fluid they show a decreased standard deviation of lift and/or drag in stalled condition.

Negative aerodynamic damping, that is where the airfoil in stalled conditions shows a certain negative aerodynamic damping. According to several aspects of the present invention, aerodynamic airfoil sections or blades are designed which when exposed to a stream of fluid they show an increase in the aerodynamic damping in stalled conditions.

These designs are in a general aspect of the present invention aimed at modifying existing airfoil sections or blades applied in wind turbine applications as many existing wind turbines suffers the problems of poor power quality, high fatigue loads, aerodynamically induced vibrations and/or unreliability of power and loads for wind turbines operating at high wind speeds where the airfoil sections or blades are just before or in stall which is believed to be associated with the problems listed above.

Some attempts have been put forward in the past which in generally have led to devices for disturbing the airflow boundary layer on the airfoil section or blade so much that the boundary layer flow undergoes transition from laminar to turbulent flow in an abrupt way in order to stabilise the flow. None of these devices have had an aerodynamic shape so that the surface and/or the tangent to the surface in the vicinity of the intersections between the device and the airfoil and blade are smooth such as continuous. These devices are characterised in being flat plates extending normal to the surface of the airfoil section or blade, which is only naturally as the understanding of the flow associated with the problems listed above has not been accomplished earlier. Accordingly, none of these devices have been designed with the objective to avoid double stall, to improve the insensitivity to leading edge roughness in stalled conditions, to increase the lift-drag ratio just before stall and in stalled conditions and/or to decrease the variations of the aerodynamic loads in stall whereby the design of these devices has led to devices producing for instance very high drag.

On the other hand, recent research has revealed some perception of the phenomena termed double stall as disclosed in C. Bak, H. A. Madsen, P. Fuglsang, F. Rasmussen; "Double Stall"; June 1998 (1998–06); Riso National Laboratory, Roskilde; XP002140078. This document discloses calculations and wind tunnel tests of flows past different airfoil sections at different conditions and concludes that there could be a connection between the position of a real upper side free transition point being close to a real critic transition point (that is the transition point which trick bursting of a leading edge separation bubble) and double stall. However, no conclusion is disclosed and in particular neither modifications to airfoils nor methods for designing airfoils are disclosed.

Also, the patent application PCT/US98/24952 by Midwest Research Institute describes airfoils for wind turbines. However, this description does not contain a description of modifications of existing airfoils and/or blades. Neither does it describes a design method nor modifications to airfoils.

Furthermore, the U.S. Pat. No. 787,503 by General Motors Corporation describes airfoils for high efficiency/high lift fans. This invention concerns airfoils for use for low Reynolds numbers. Compared to airfoil flows with Reynolds numbers above approximately 1,000,000 airfoil flows with Reynolds numbers below approximately 1,000,000 have different flow patterns in which the laminar flows are much more dominant. This means that laminar separation bubbles are much bigger and more or less always a part of the flow pattern. For high Reynolds numbers, i.e. above 1,000,000, laminar separation bubbles are not very dominant except of some airfoils for angles of attack above maximum lift. Thus, airfoils used for Reynolds numbers below 1,000,000 are behaving quite different from airfoils used for Reynolds numbers above 1,000,000. In accordance with this, neither design methods nor modifications have been disclosed.

As the computer power available has been ever increasing and thereby the methods available for simulating the flow past airfoil sections and blades has correspondingly become more sophisticated it is now possible to calculate the flow past two-dimensional- and three dimensional-lifting bodies.

By these new possibilities it is possible to study the flow in higher details and more interesting, as applied in the present invention, it is possible to simulate different flow situations. Also, the increasing computer power has made it possible to optimise complex problems by numerical means. For instance, the combination of flow simulations and numerical optimisations of the airfoil section shape or blade shape has improved the possibility of optimising airfoil sections and blades or parts thereof of existing airfoil sections and blades.

According to the present invention it has been found that an airfoil section or blade or an aerodynamic device used for modification of an airfoil section or a blade may be designed so that the sections or blades does not suffer the same drawbacks as the prior art devices and actually solve or improve the following problems: the risk of double stall, sensitivity to leading edge roughness in stall, low lift-drag ratio just before stall and in stall, big variations of aerodynamic loads in stall and negative aerodynamic damping.

According to the invention, it has been found that airfoil sections or blades wherein the transition point which tricks leading edge stall is to be situated downstream of the free transition point in order to avoid double stall and to decrease the variations of the aerodynamic loads in stall of the blade. The location of the transition point which tricks leading edge stall is at a location where a leading edge laminar separation bursts, i.e. the transition point has moved so much downstream that the flow cannot attach the surface. Also, it has been found that the position of the free transition point, also called natural transition point, the pressure distribution and the shape of the airfoil section or blade can control the overall aerodynamic performance in stall. As will appear from the detailed description herein, this gives rise to a new understanding of the decisive criteria for designing airfoil sections or blades; in particular two- or three-dimensional airfoil sections used for aerodynamically purposes.

In general, the flow produced by airfoil sections or blades designed according to the present invention have the potential to fulfil certain desired characteristics. For instance, if it is desired to avoid the tendency to double stall it is required in the design process that the flow is stable in the sense that if a suction side leading edge laminar separation bubble is present then this bubble is substantially stable in time. As mentioned above this is provided by designing the airfoil sections or blades so that the position of the free transition point is situated upstream of the transition points which tricks leading edge stall, which in turn is assured by numerical modelling the flow past the airfoil or blade.

Thus, the present invention relates in a first aspect to a modified wind turbine airfoil section comprising, such as being constituted by, composed of or made up by, an airfoil section and a contour modification thereto. It has been found according to the present invention that it is essential that the modified airfoil section has a contour modification wherein the first, the second and optionally the third derivative of the outer contour of the contour modification are smooth and continues, such as substantially smooth and continues in order to modify airfoils according to the problems discussed above.

The terms "smooth and continuos" is herein used in accordance with the ordinary aerodynamical sense of those terms. Accordingly, "smooth and continuos" is used to denote a contour—or surface—which do not spoil the flow past the contour or surface. Thus, in general the mean contour or mean surface of an airfoil section or blade is at least considered smooth and continuos, preferably quantified by having first, second and optionally third derivatives being smooth and continues, if that mean contour or mean surface has no bumps or edges. Please also consult section "Brief explanation of certain terms".

Furthermore, it has been found that a modified airfoil section according to the present invention preferably has a contour wherein the first, the second and optionally the third derivative of the contour of the modified airfoil section are smooth and continuos, such as substantially smooth and continuos, except at the trailing edge of the airfoil—that is, not only the modification of the airfoil but the whole airfoil must preferably have a contour being smooth and continues—preferably, except at the trailing edge.

In particular preferred embodiments, connected to modifying airfoils in order to avoid double stall, it may be preferred that the modified airfoil section according to the present invention has a contour wherein the angle between the suction surface and the chord line evaluated substantially 2% chord length behind the leading edge is larger than 32°, preferably larger than 33°, such as larger than 34°, in some situations preferably larger than 35°, and even preferably larger than 36°, preferably larger than 37°, such as larger than 38°, preferably larger than 39°, and even most preferably larger than 40°.

Alternatively or supplementary to the geometrical constraints on the suction side surface in relation to the embodiments pertaining to double stall it may be preferred that the suction side free transition point is located upstream of the transition point which tricks bursting of a leading edge separation bubble. These transition points are preferably evaluated at a Reynolds number between 1,000,000 and 20,000,000, but the actual size of the Reynolds number depends, of course, of the application of the modified airfoil section.

In such situations, the suction side free transition point may preferably be located more than 0.25% chord length, preferably more than 0.5% chord length, such as more than 1% chord length, preferably more than 1.5% chord length, in some situations more than 2% chord length, and even more than 3% chord length, preferably more than 5% chord length, such as more than 7% chord length, preferably more than 8.5% chord length, and even more than 10% chord length upstream of the transition point which tricks bursting of a leading edge separation bubble, preferably being evaluated close to or at maximum lift, such as at angles of attack between 2° before and 4° after maximum lift. Again, the transition points are preferably evaluated at a Reynolds number between 1,000,000 and 20,000,000 but the actual size of the Reynolds number depends, of course, of the application of the modified airfoil section.

In other preferred embodiments relating to modifying airfoils in order to minimise or avoid the influence of leading edge roughness it may be preferred that the contour of the modified airfoil section according to the present invention preferably is so shaped that the suction side free transition point is located less than 10% chord length, preferably less than 8.5% chord length, such as less than 7% chord length, preferably less than 5% chord length, in some situations less than 3% chord length, and even less than 2% chord length, preferably less than 1.5% chord length, such as less than 1% chord length, preferably less than 0.5% chord length, and even less than 0.25% chord length from the leading edge, preferably being evaluated around or at maximum lift, such as at angles of attack between 6° before and 6° after maximum lift. The transition points is preferably evaluated at a Reynolds number between 1,000,000 and 20,000,000, but the actual size of the Reynolds number depends, of course, of the actual application of the modified airfoil.

Such preferred embodiments may very advantageously be combined with embodiments pertaining to double stall and the other embodiments discussed below.

According to present invention a high lift-drag ratio is often aimed at either alone or in combination with the measures relating to double stall and/or influence on leading edge roughness. In preferred embodiments of the modified airfoil section according to the present invention the modified airfoil section may preferably have a lift-drag ratio being higher than the airfoil without the contour modification, said lift drag-ratio being preferably evaluated in an interval ranging from 8 degrees angles of attack before stall to maximum lift.

More specifically, it is often preferred that a modified airfoil section according to the present invention has a lift drag ratio being larger than 20, such as larger than 50, preferably larger than 60, such as larger than 75 and most preferably larger than 100, said lift drag-ratio being preferably evaluated in an interval ranging from 5 degrees angles of attack before stall to maximum lift.

Furthermore, preferred embodiments of a modified airfoil section minimising aerodynamic loads alone or in combination with the other embodiments of the modified airfoil section are preferably provided by airfoil sections, wherein the angle between the suction surface and the chord line evaluated substantially 2% chord length behind the leading edge is larger than 32°, preferably larger than 33°, such as larger than 34°, in some situations preferably larger than 35°, and even preferably larger than 36°, preferably larger than 37°, such as larger than 38°, preferably larger than 39°, and most preferably larger than 40°.

In such situations airfoil sections according to the present invention are preferably shaped so that the suction side free transition point is located more than 0.25% chord length, preferably more than 0.5% chord length, such as more than 1% chord length, preferably more than 1.5% chord length, in some situations more than 2% chord length, and even more than 3% chord length, preferably more than 5% chord length, such as more than 7% chord length, preferably more than 8.5% chord length, and even more than 10% chord length upstream of the transition point which would trick bursting of a leading edge separation bubble, preferably evaluated close to or at maximum lift, such as of angles of attack between 2° before and 4° after maximum lif. The transition points are preferably evaluated at a Reynolds number between 1,000,000 and 20,000,000, but the actual size of the Reynolds number depends, of course, on the actual application of the modified airfoil section.

When the measure to be fulfilled by the modified airfoil is relating to aerodynamic damping alone or in combination with the other measures, embodiments of the modified airfoil are often preferred, wherein normalised minimum edgewise damping, $c_x$, is greater than −2, preferably greater than −1.8, such as greater than −1.6, preferably greater than −1.4, in some situations greater than −1.2, preferably greater than −1.0 and even greater than −0.8 and wherein the normalised minimum flapwise damping, $c_y$, is greater than −6, preferably greater than −5, such as greater than −4, preferably greater than −3, in some situations greater than −2, preferably greater than −1 and even greater than 0.

The normalised damping coefficients, $c_x$ and $c_y$ should preferably be obtained by normalising $C_X$ and $C_Y$ by $0.5*c*p*W$, and should preferably be evaluation after maximum lift, such as at angles of attacks from maximum lift to 10° after maximum lift. The damping is preferably evaluated at a Reynolds number between 1,000,000 and 20,000,000, but the actual size of the Reynolds depends, of course, on the actual application of the airfoil.

The present invention relates in another aspect to a modified blade for a wind turbine having at least one modified airfoil section according to present invention. Thus, in practical implementations in accordance with the present aspect of the present invention an entire blade has not to be modified but only those parts or that part of a blade which suffers one or more of the problems discussed above. On the other hand, in case the entire blade suffers one or more of the problems discussed above all the airfoil sections of the blade may preferably be modified according to the present invention.

Preferably, a modified blade for a wind turbine having at least one modified airfoil section according to the present invention is modified so that bursting of a leading edge laminar separation bubble is avoided in at least the vicinity of the at least one airfoil section being modified.

Preferably, the modified blade for a wind turbine according to the present invention is a blade wherein the contour modification is provided by an aerodynamic device mounted on a blade.

In very important embodiments of the modified blade for a wind turbine according to present invention the aerodynamic device is shaped so that once mounted on a blade, the surface at least in the vicinity of the intersections between the device and the blade are smooth and continues. This measure is preferably provided by shaping the device at its extremities similar to the shaped of the blade in the regions close to these extremities.

Accordingly, it is often preferred that the aerodynamic device of the modified blade for a wind turbine is shaped so that once mounted on a blade, the tangent to the surfaces in the vicinity of the intersection(s) between the aerodynamic device and the blade is(are) smooth and continuos.

According to the findings of the present invention modifications pertaining to the problems discussed above may preferably be applied mainly—or only—in the leading edge region of the blade. Thus, in preferred embodiments of the present invention the aerodynamic device modifies a blade only in the leading edge region or modifies substantially only the leading edge region of a blade.

In agreement with the different problems solved by the invention, the blade on which the aerodynamic device is mounted may preferably a blade having an inclination towards leading edge laminar separation, such as producing a flow past the airfoil having leading edge laminar separation at a Reynolds number between 1,000,000 and 20,000,000 and preferably at an angle of attack between 5° before maximum lift and 8° after maximum lift.

Different measures exist in order to implement modifications of blades according to the present invention. In a particular important embodiment, the contour modification or aerodynamic device may preferably be provided by adding material, such as a hardening material, to a blade.

In other equally important embodiments of the implementation of the modification, the modification and/or aerodynamic device may preferably be made as a flexible sheet, such as a rubber sheet and/or plastic sheet, having the form of the modification and/or aerodynamic device.

Alternatively (or in combination) the contour modification or aerodynamic device may preferably be made as a flexible sheet, such as rubber sheet or plastic sheet, being substantially uniform in one direction and the modifications needed in order to modify a blade may preferably be provided by compression and/or extraction of the flexible sheet.

In many cases it is advantageously to prepare the contour modification of site. Thus, the contour modification or aerodynamic device may preferably be made as a prefabricated device to be attached to a blade. Such prefabrication may preferably be obtained by extruding a flexible material such as rubber, plastic or non-plastic material such as glass fibre, aluminium or steel. In such cases the geometry of the device may be some average of the modifications for each of the selected airfoil sections to be modified.

Such a prefabricated technique may also very advantageously be applied in connection with fabrication of new blade, i.e. a blade not yet being in use. When such a new blade is manufactured the leading edge is normally not smooth, which non-smoothness is remedied by cutting away material of the blade in the leading edge region. In connection with the present invention, the whole leading edge region is removed from the blade and replaced by a modification according to the present invention.

In connection to this, it should be noted that the description of the modification according to the present invention has been focused on a positive modification, that is a modification moving the contour of the airfoil section out in the flow. Anyhow, the invention is equally well suited in case of a negative modification, that is a modification moving the contour away from the flow, is required. In this case removal of material from a blade may provide the practical implementation.

The invention relates in another aspect to a method of modifying, by use of a computer system, the shape of a blade or an airfoil section. In the method according to invention a design set-up has been provided in terms of an objective function to be minimised representing preferably the negative efficiency of the airfoil section or blade, such as representing lift-drag ratios and/or the driving force which is the force in the chord direction in upstream direction at least at one angle of attack, design variables representing points on at least a part of the airfoil section or of the blade, geometrical constraint(s) stipulating that each geometrical modification to the airfoil section or to the blade determined by the method must be so that the first the second and optionally the third derivative of the airfoil section contour or blade contour in at least in the vicinity of the intersection between the modification of the airfoil section or the blade and the non-modified part of the airfoil section of the blade are smooth and continuos, such as substantially smooth and continuos, aerodynamically constraint(s), such as constraints interrelating the distance between the free transition point and the transition point which tricks bursting of a leading edge separation bubble, eventually expressed in term of geometrical constraint(s).

In put to the method are, of course, also fluid dynamical parameters such as Reynolds number, velocity/velocities, viscosity, density, Mach number etc.

The method utilises the set-up and comprises the following steps:

a) providing an initial shape of the airfoil section or blade, preferably being either an existing airfoil, an initial guess on the airfoil to be designed or an airfoil shape enabling a flow to be calculated, b) simulating such as calculating a number of flows past the airfoil section or blade necessary to evaluate the aerodynamically constraints, c) and if the aerodynamically constraints is not fulfilled then the initial shape of the airfoil section or blade is modified by modifying the design variables based on minimisation of the objective function and respecting geometrical constraints, thereby providing a new shape of the airfoil section or blade, and repeating steps b) and c) based on the new shape of the airfoil until the objective function is minimised thereby providing a modified airfoil.

In its basic form, the geometrical constraints relate particularly to extremities of modifications determined by or during execution of the method. In preferred embodiments of the method according to the invention the geometrical constraint(s) stipulates or further stipulates that each geometrical modification to the airfoil section or to the blade determined by the method must have smooth and continues, such as substantially smooth and continues first, second and optionally third derivatives. Such preferred embodiments will ensure that a modification determined by—or during execution of—the method will be smooth and continues.

In a particular preferred embodiment of the method according to the present invention, it is often preferred that the geometrical constraints stipulate or further stipulates that the contour of the modified airfoil section or the contour of the modified blade determined by the method must have smooth and continues, such as substantially smooth and continues, first, second and optionally third derivatives except at the trailing edge.

In preferred embodiments of the method, in connection with double stall, it is often preferred that the aerodynamically constraint(s) stipulates or further stipulates that the free transition point is located upstream of the transition point that tricks bursting of a leading edge separation bubble. In such situations, it may be preferred that the free transition point is to be located more than 0.25% chord length, such as more than 0.5% chord length, preferably more than 1% chord length, such as more than 1.5% chord length, preferably more than 2% chord length of the chord length upstream of the transition point which trick bursting of a leading edge separation bubble, preferably evaluated close to or at maximum lift, such as at angles of attack between 2° before and 4° after maximum lift.

Alternatively or in combination with the geometrical expressed aerodynamically constraint(s) it is often preferred that the aerodynamically constraint(s) stipulates or further stipulates attached suction side flow.

In yet another preferred embodiment of the method in connection with double stall the aerodynamically constraint(s) may preferably be expressed in terms of geometrical constraint(s) as the angle between the suction surface and the chord line evaluated at substantially 2% chord length behind the leading edge to be larger than 32°, preferably larger than 33°, such as larger than 34°, in some situations preferably larger than 35°, and even preferably larger than 36°, preferably larger than 37°, such as larger than 38°, preferably larger than 39°, and most preferably larger than 40°.

It is often preferred commonly for all the embodiments of the method pertaining to double stall that the objective function stipulates or further stipulates maximisation of the efficiency such as lift-drag-ratio at angles of attack between zero lift and maximum lift, e.g. −3° to 13° angles of attack.

Those preferred embodiments of the method according to present invention discussed above in connection with double stall might very advantageously be combined with embodiments of the method pertaining to other flow problems as discussed below.

Accordingly, in another preferred embodiment, pertaining to leading edge roughness sensitivity, the aerodynamic constraint(s) stipulates or further stipulates that the suction side free transition point, must be located less than 10% chord length, preferably less than 8.5% chord length, such as less than 7% chord length, preferably less than 5% chord length, in some situations less than 3% chord length, and even less than 2% chord length, preferably less than 1.5% chord length, such as less than 1% chord length, preferably less than 0.5% chord length, and even less than 0.25% chord length from the leading edge, preferably being evaluated around or at maximum lift, such as at angles between 6° before 6° after maximum lift.

In connection with such preferred embodiments or combinations thereof, it is often preferred that the objective function stipulates or further stipulates maximisation of the lift-drag-ratio at or between 2° and 10° degrees angles of attack. In some situations it may be preferred that maximisation takes place between angles of attack showing zero lift and maximum lift.

In order to achieve high lift-drag ratios in general or in combination with the other measures to be achieved, it is often preferred that the objective function stipulates maximisation of the lift-drag-ratio at or between 8° and 12° degrees angles of attack. In some situations it may be preferred that the maximisation of the lift-drag-ratio takes place at or between 8° angles of attack before maximum lift and the angle of attack showing maximum lift.

In preferred embodiments of the method according to the present invention, in which the measure to be achieved pertains to aerodynamic loads, it is often preferred that the aerodynamically constraint(s) is(are) expressed in terms of geometrical constraint(s) as the angle between the suction surface and the chord line evaluated substantially 2% chord length behind the leading edge must larger than 32°, preferably larger than 33°, such as larger than 34°, in some situations preferably larger than 35°, and even preferably larger than 36°, preferably larger than 37°, such as larger than 38°, preferably larger than 39°, and most preferably larger than 40°.

In combination thereto—or alone—it may be preferred that the aerodynamically constraint(s) stipulates or further stipulates that the free transition point is located downstream of the transition point that tricks bursting of a leading edge separation bubble.

In such situations it may be preferred that the aerodynamically constraint(s) stipulates or further stipulates that the free transition point, is located more than 0.25% chord length, preferably more than 0.5% chord length, such as more than 1% chord length, preferably more than 1.5% chord length, in some situations more than 2% chord length, and even more than 3% chord length, preferably more than 5% chord length, such as more than 7% chord length, preferably more than 8.5% chord length, and even more than 10% chord length upstream of the transition point which would trick bursting of a leading edge separation bubble; preferably evaluated close to or at maximum lift, such as angles of attack between 2° before and 4° after maximum lift.

In connection with such preferred embodiments or combinations thereof, it is often preferred that the objective function stipulates maximisation of the lift-drag-ratio at or between 2° and 10° degrees angles of attack, or preferably at or between the angles of attack showing zero lift and maximum lift.

According to preferred embodiments of the method, pertaining to aerodynamic damping, it may be preferred that the aerodynamic constraint(s) stipulates or further stipulates that the normalised minimum edgewise damping, $c_x$, should be greater than −2, preferably greater than −1.8, such as greater than −1.6, preferably greater than −1.4, in some situations greater than −1.2, preferably greater than −1.0 and even greater than −0.8, and wherein the normalised minimum flapwise damping, $c_y$, should be greater than −6, preferably greater than −5, such as greater than −4, preferably greater than −3, in some situations greater than −2, preferably greater than −1 and even greater than 0.

The normalised damping coefficients, $c_x$ and $c_y$, should preferably be obtained by dividing $C_X$ and $C_Y$ by $0.5*c*p*W$ and the normalised damping coefficients, $c_x$ and $c_y$, should preferably be evaluated after maximum lift, such as angles at attacks from maximum lift to 10° after maximum lift.

In connection thereto—or in combination with the other embodiments mentioned above—it is often preferred that the objective function stipulates or further stipulates maximisation of the lift-drag-ratio at or between 2° and 10° degrees angles of attack.

According to the above discussion of the different aspects of the invention and in particular the discussion of different embodiments thereof, it is mentioned that the different embodiments may very advantageously be combined. Combining the different embodiments one might have to decide which embodiments is the most important because some times may be a compromise between different desired characteristics.

BRIEF DESCRIPTION OF THE DRAWINGS

The invention will now be described in greater details in connection with the accompanying drawings, in which FIG. 1 (upper) shows the flow past a NACA 63-415 airfoil, the flow is visualised by means of stream lines, FIG. 1 (lower) shows a detail of the flow depicted in FIG. 1 (upper); the detail is an enlarged view of the flow past the leading edge of the airfoil and discloses a region of re-circulating flow termed a laminar separation bubble.

DETAILED DESCRIPTION OF PREFERRED EMBODIMENTS OF THE INVENTION

Figure 1:
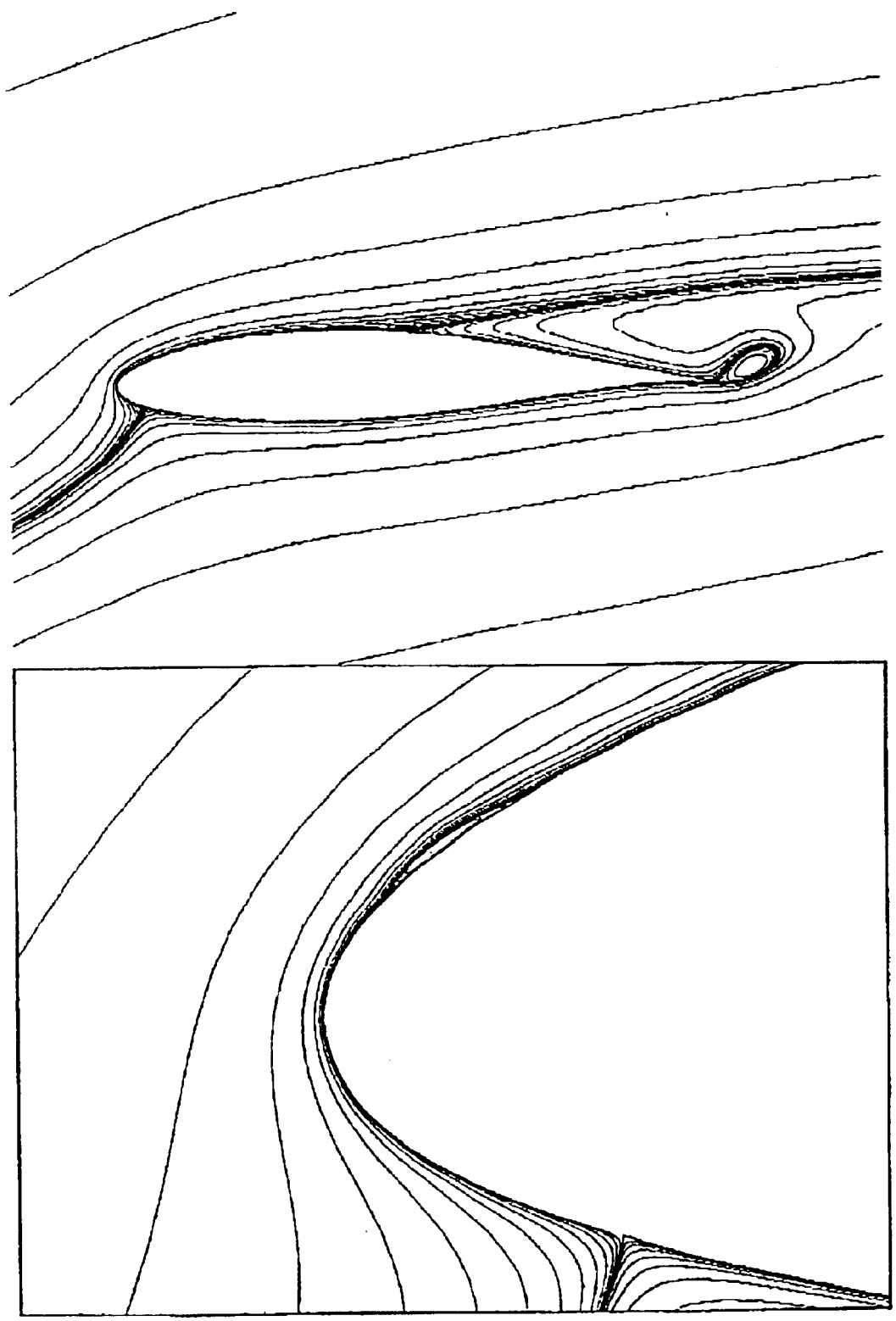

The use of mathematical and numerical means for simulating and/or calculating flow past aerodynamically shaped bodies has according to the present invention been applied in order to assure that an airfoil flow is resistant to bursting of leading edge laminar separation bubbles, resistant to leading edge roughness and/or to severe negative aerodynamic damping. Furthermore, it ensures a greater efficiency of the airfoils such greater lift-drag ratio if desired.

The design method according to the present invention contains to parts: A numerical optimisation approach and a numerical flow solver.

NUMERICAL OPTIMISATION APPROACH

The design method is based on numerical optimisation. The objective function is minimised by changing the design variables. The design variables are a number of control points that describe the airfoil shape. Inequality constraints are side values for the design variables and bounds on response parameters from flow calculations and structural calculations.

An airfoil section shape or a blade is input together with 1) the objective function, which for instance is maximum lift-drag-ratio at several angles of attack, 2) the design variables, which are the points describing the geometry and 3) the constraints, which for instance stipulates that the tangent of the surfaces in the vicinity of the intersection between a possible aerodynamic device and the airfoil so that the intersection is continues. The optimisation process is iterative involving many calculations of flow and structural properties where the design is improved gradually. The flow calculations are used to estimate the value of the objective function and the constraints. Multiple angles of attack are calculated to allow off-design optimisations. The combination of flow and structural responses allows interdisciplinary optimisation and when available, other calculation tools can easily be incorporated. A simplex optimiser can for instance be used with a traditional finite difference sensitivity analysis.

A smooth airfoil shape is important for the optimisation results. The shape description should have as much geometric flexibility as possible with as few design variables as possible to secure an effective and representative search of the design space with acceptable computational costs. In principle, any physically realistic shape should be possible to allow design from scratch. The airfoil shape can for instance be represented by a single B-spline curve defining the optimised shape by a set of control points. The optimised shape could for instance be a complete airfoil section or just the leading edge part of the airfoil section or similar for a blade.

NUMERICAL FLOW SOLVER

A flow solver is predicting the flow around the airfoil during the optimisations based on the actual airfoil geometry and the specified flow conditions. For given angles of attack, Reynolds number and Mach number, the flow solver provides for instance the pressure distribution around the airfoil section or blade and the integrated forces on the airfoil section or blade. In addition, numerous boundary layer parameters are calculated. In the flow solver, transition is modelled for instance by the $e^n$ method with n=9 as default value.

The numerical flow solver gives the possibility of being able to simulate different states in the flow in the sense that when an airfoil is tested in a real flow situation being the counterpart to the numerical flow situation, the transition points in question are generally not that stable and distinct. In the real flow the flow undergoes transition from laminar to turbulent flow over a transition length and the location of the transition will fluctuate somewhat. Depending on the geometry of the airfoil section or blade and the characteristics of the fluid flowing past the airfoil section or blade a flow with or without bursting will be present. Furthermore, the pressure distribution will change depending on the location of the transition point and this will reveal the resistance to leading edge roughness.

When the flow is simulated by use of numerical means the turbulent flow is often modelled by use of for instance an eddy-viscosity model. In the transition region the transition may suitably be modelled by use of an intermittence function taking into account the only part time presence of turbulence in the flow. Such an intermittence function often turns on the eddy-viscosity model gradually over a predetermined transition length.

Following the procedure described above an airfoil section shape or a part of an airfoil section shape (or similar for a blade) is produced through use of numerical optimisation. Depending on which characteristics are required for the modified airfoil section or blade different set ups for design and/or optimisation are needed. Before the optimisations are carried out it is important to understand the physics and the mechanism underlying the different parameters influencing stall. Five different parameters will be described in the following.

NO TENDENCY TO DOUBLE STALL

Double stall is an airfoil flow situation in stalled condition in which the flow pattern jumps between trailing-edge stall and leading-edge stall. The mechanism tricking this situation is a laminar separation bubble at the leading edge of the airfoil, which sometimes appears already before stall, but at some airfoil section or blades bursts at an angle of attack greater than the angle of attack for maximum lift. The reason for the bursting of the bubble is that the mean free transition point is too close to a downstream transition point for which leading-edge stall appears.

To determine the distance between the free transition point and the transition point for which leading-edge stall appears a flow solver should be used which can predict free transition points and possibly where the transition point can be fixed. Thus, the free transition point and the transition point for which leading-edge stall appears are provided numerically in the sense that for a given airfoil section or blade different calculations and/or determinations of the fluid past that airfoil section or blade is performed. In general at least two calculations and/or determinations are to be performed:

Calculation using free transition. In this case the transition of the flow is modelled so that it follows a free transition, where the free transition is modelled by some empirical relation describing the transition from laminar to turbulent flow which may be based on suitable parameters for the boundary layer such as the momentum thickness, Reynolds number based on the momentum thickness etc.

Calculation of the flow which shows leading edge stall. In this calculation of the flow the transition point is forced to be situated in a location where a leading edge separation bubble is bursting irrespectively of the fact that in a real flow situation the flow might have become turbulent upstream of this point whereby the bursting would not occur.

The method may be viewed upon as a design method assuring that bursting of a leading edge separation bubble will not occur and the design method may also be used as a test method for testing the stability of an airfoil flow to withstand bursting of a leading edge separation bubble. In the design of the airfoil section shape or part of the airfoil section shape (or blade) the following set up for the optimisation should be as follows:

The objective function, which is to maximise the efficiency of the airfoil such as a linear combination of the lift-drag-ratio at one or several angles of attack where the airfoil is not stalled, for instance 2° and 10° angles of attack, The design variables, which are the points describing the airfoil section or part(s) of the airfoil section (or blade) and The constraints, which are
1) The first, second or even third derivative of the airfoil section or blade contour in the vicinity of the intersection between the modified part of the airfoil section or blade and the existing airfoil section or blade so that the intersection is smooth and continues,
2) The free transition point, which should be more than 0.5% chord length upstream of the transition point which would trick bursting of a leading edge separation bubble. This should be done at an angle of attack where the airfoil to be modified shows a distance between the two transition points of less than 0.5% chord length.
3) An alternative to second constraint type is to use the angle between the suction surface and the chord line evaluated substantially 2% chord length behind the leading edge which should be larger than about 35°. This kind of constraint is based on a rule of thumb more than the physics.

To investigate the tendency to double stall a flow solver is used, which can predict the position of the transition point assuming free transition. Furthermore, the flow solver should be able to fix the transition point so that the minimum transition point causing a burst of the laminar separation bubble at the leading edge and thereby a leading edge stall can be predicted. The investigation should be carried out for angles of attack near maximum lift. If the free transition point is more than a certain distance upstream of the transition point causing leading edge stall the airfoil section or blade is said to show no tendency to double stall.

MAXIMUM LIFT INSENSITIVE TO LEADING EDGE ROUGHNESS

Maximum lift sensitivity to leading edge roughness relates to a flow situation in which bugs, dust, ice or other kind of material changes the roughness at the leading-edge part of the airfoil. This changes the pressure distribution around the area at the surface in which the roughness is located and the downstream content of the boundary layer. For instance, this means that the suction pressure at the suction side of the airfoil is reduced leading to a reduction of the lift and/or an increase of the drag. Since a suction peak typically is located in the same area as the roughness a great loss of lift and an increase of drag are observed compared to a smooth surface with no roughness.

The change in the pressure distribution is due to changes in the boundary layer flow. For airfoil boundary layer flows transition from laminar to turbulent flow appears at some distance from the leading edge. Furthermore, the height of the roughness adds to the thickness of the boundary layer flow at the airfoil downstream of the roughness. When roughness accumulates at the leading edge the transition from laminar to turbulent flow moves toward the leading edge. This results in a decrease of the suction pressure on the suction side of the airfoil. However, if the shape of the airfoil with smooth surfaces results in a transition point close to the leading edge then the movement of the transition point caused by roughness will be limited leading to a limited change in the pressure distribution and thereby a limited change in the lift and the drag. Also, the increase of the displacement thickness downstream of the roughness is taken into account in the design of the modification. Thus, the difference in displacement thickness with and without roughness for instance near the trailing edge should be minimised in an airfoil modification. In the design of the airfoil shape or part of the airfoil shape the following set up for the optimisation should be as follows:

The objective function, which is to maximise the efficiency of the airfoil such as a linear combination of the lift-drag-ratio at one or several angles of attack where the airfoil is not stalled for instance 2° and 10° angles of attack, The design variables, which are the points describing the airfoil or part(s) of the airfoil and The constraints, which is
1) The first, second or even third derivative of the airfoil contour in the vicinity of the intersection between the modified part of the airfoil and the existing airfoil so that the intersection is smooth and continues,
2) The free transition point at different angles of attack above the angle of attack at which stall appears, which should be located further upstream than it is found on the airfoil to be modified. Depending on the airfoil to be modified the free transition point should be moved further upstream to increase the insensitivity to roughness. This means that the free transition point for the airfoil to be modified should be calculated to find the location of the free transition point on the suction side. Then the location of the free transition point should be located upstream of this on the modified airfoil.
3) The displacement thickness at some location on the airfoil, for instance the trailing edge, should below a certain value. This value is preferably determined by calculating the displacement thickness at the same location for the airfoil to be modified.

To investigate the insensitivity to leading edge roughness a flow solver is used, which can predict the position of the transition point assuming free transition. Furthermore, the flow solver should contain a model for roughness on the airfoil surface so that the effect of leading edge roughness could be estimated. The investigation should be carried out for angles of attack near maximum lift.

HIGH LIFT-DRAG RATIO

The lift-drag ratio, determined as the airfoil lift force divided by the airfoil drag force, is a measure for the efficiency of the airfoil. For aeroplanes this ratio is a direct measure for the number of meters or feet the aeroplane will move in horizontal direction before it has lost one meter or one foot height in vertical direction. For wind turbines there is no illustrative way of explaining this measure, but still it is important because the driving force of the rotor producing the wind turbine power correlates to the lift-drag ratio. Especially, high lift-drag ratio for the wind turbine airfoils is important for wind speeds close to the wind speed at which the peak power is obtained. This is because peak power is desired for as small wind speeds as possible to increase the efficiency of the wind turbine. At these wind speeds the airfoils on the outer part of the rotor has just entered stall or are just about to enter stall. This is the main reason for requiring high lift-drag ratio in an angle of attack interval just before stall and until maximum lift is obtained. In the design of the airfoil shape or part of the airfoil shape the following set up for the optimisation should be as follows:

The objective function, which is to maximise a linear combination of the lift-drag-ratio at one or several angles of attack just before and just after stall appears, but before maximum lift, for instance 8° and 12° angles of attack, The design variables, which are the points describing the airfoil or part(s) of the airfoil and The constraints, which is
1) The first, second or even third derivative of the airfoil contour in the vicinity of the intersection between the modified part of the airfoil and the existing airfoil so that the intersection is smooth and continuos.

Since the lift-drag-ratio is maximised through the objective function there is no need to use constraints on the lift-drag ration for this parameter, Thus, the optimisation ensures that the lift-drag ratio will be improved compared to the airfoil to be modified.

SMALL VARIATIONS OF THE AERODYNAMIC LOADS

Variations in the aerodynamic loads, measured as the standard deviation of the airfoil lift and/or the airfoil drag, indicate how stabile and smooth the airfoil flow is. Especially, in stalled conditions big variations are expected. Use of airfoils in stalled conditions is unique for wind turbines. Thus, for wind turbines it is important to decrease the variations of the aerodynamic loads in stall Big variations will lead to high fatigue loads for the wind turbine structure and might even trick vibrations in the structure which in worst cases will break down. If double stall appears it will result in very big variations in the aerodynamic loads. This is why big variations in the aerodynamic loads will be avoided in the design of airfoils or parts of airfoils in the same way that double stall is avoided. In the design of the airfoil shape or part of the airfoil shape the following set up for the optimisation, which is the same as for the double stall set-up, should be as follows:

The objective function, which is to maximise the efficiency of the airfoil such as a linear combination of the lift-drag-ratio at one or several angles of attack where the airfoil is not stalled for instance 2° and 10° angles of attack, The design variables, which are the points describing the airfoil or part(s) of the airfoil and The constraints, which is
1) The first, second or even third derivative of the airfoil contour in the vicinity of the intersection between the modified part of the airfoil and the existing airfoil so that the intersection is smooth and continues,
2) The free transition point, which should be more than 0.5% chord length upstream of the transition point which would trick bursting of a leading edge separation bubble. This should be done at an angle of attack where the airfoil to be modified shows a distance between the two transition points of less than 0.5% chord length.
3) An alternative to second constraint type is to use the angle between the suction surface and the chord line evaluated substantially 2% chord length behind the leading edge which should be larger than 350°. This kind of constraint is based on a rule of thumb more than the physics.

To investigate the variations of the aerodynamic loads in stall a flow solver is used, which can predict the position of the transition point assuming free transition. Furthermore, the flow solver should be able to fix the transition point so that the minimum transition point causing a burst of the laminar separation bubble at the leading edge and thereby a leading edge stall can be predicted. The investigation should be carried out for angles of attack near maximum lift. If the free transition point is more than a certain distance upstream of the transition point causing leading edge stall the airfoil is said to show small variations of the aerodynamic loads in stall.

HIGH AERODYNAMIC DAMPING

Aerodynamic damping is a measure for how well the structure can resist vibrations caused by aerodynamic loads. The aerodynamic damping can be determined in the airfoil chord direction as:

$$C_x = 0.5 * c * \rho * (U/W) * [C_D * (2*U^{2*} + V^2)/U - V*(\partial C_D/\partial \alpha) - V*C_L + (V^2/U)*(\partial C_L/\partial \alpha)],$$

and orthogonal to the airfoil chord direction it is determined as:

$$C_y = 0.5 * c * \rho * (U/W) * [C_D * (U^2 + 2*V)/U + V*(\partial C_D/\partial \alpha) + V*C_L + U*(\partial C_L/\partial \alpha)],$$

where c is the chord length [m], p is the fluid density [kg/m$^3$], U and V is the velocity in chord direction and orthogonal to chord direction, respectively [m/s], $W = (U^2 + V^2)^{1/2}$ [m/s], $C_L$ and $C_D$ is the lift and drag coefficient [-], respectively and $\alpha$ is the angle of attack [Radians].

For wind turbine applications it is important that the sum of aerodynamic damping in the chord direction and/or orthogonal to the chord direction and the structural damping of the blade in chord direction and/or orthogonal to the chord direction are positive. If the sum of the aerodynamic and structural damping is negative then vibrations will grow and the turbine might break down. Since the aerodynamic damping for airfoil sections or blades such as wind turbine blades has a minimum in stalled conditions it is important to maximise the damping in stalled conditions to avoid that the total damping is negative. In the design of the airfoil shape or part of the airfoil shape the following set up for the optimisation should be as follows:

The objective function, which is to maximise the efficiency of the airfoil such as a linear combination of the lift-drag-ratio at several angles of attack where the airfoil is not stalled or alternatively where the airfoil is below maximum lift, for instance 2° and 10° angles of attack, The design variables, which are the points describing the airfoil or part(s) of the airfoil and The constraints, which is
1) The first, second or even third derivative of the airfoil contour in the vicinity of the intersection between the modified part of the airfoil and the existing airfoil so that the intersection is smooth and continuos,
2) Damping in chord direction and damping in the direction orthogonal to the chord at different angles of attack after maximum lift, with an aerodynamic damping coefficient in the chord direction and/or orthogonal to the chord direction as mentioned above which is greater than the damping coefficient in the same directions for the existing airfoil and/or blade for which the modification is/modifications are designed. Damping in chord direction is expressed as:

$$C_x = 0.5 * c * \rho * (U/W) * [C_D * (2*U^2 + V^2)/U - V*(\partial C_D/\partial \alpha) - V*C_L + (V^2/U)*(\partial C_L/\partial \alpha)]$$

and in the direction orthogonal to the chord it is expressed as:

$$C_y = 0.5 * c * \rho * (U/W) * [C_D * (U^2 + 2*V^2)/U + V*(\partial C_D/\partial \alpha) + V*C_L + U*(\partial C_L/\partial \alpha)],$$

where c is the chord length, is the fluid density, U and V is the velocity in chord direction and orthogonal to chord direction, respectively, $W=(U^2+V^2)^{1/2}$, $C_L$ and $C_D$ is the lift and drag coefficient, respectively and a is the angle of attack. The minimum damping of $C_x$ versus $\alpha$ and/or $C_y$ versus a should be increased compared to the airfoil to be modified.

Thus, the aerodynamic damping for the airfoil to be modified should be calculated so that the damping can be forced to higher values in the optimisation of the modified airfoil.

To investigate the aerodynamic damping in stalled conditions, a flow solver is used which can predict the flow in stalled conditions well so that lift and drag in stall can be determined. The investigation of the aerodynamic damping should be carried out for angles of attack greater than maximum lift.

Modification of Airfoil Sections or Blades

In the following different examples of airfoil sections designed by the present method will be presented The examples originate from actual designs of wind turbines utilising a NACA 63-4nn basis airfoil section and a NACA 63-2nn basis airfoil. As it is common practice within the field of wind turbines the blades of the turbine have different airfoil section shapes at different locations on the blade.

MODIFIED NACA 63-4nn AIRFOILS

In the present example three different airfoil sections are considered which all belong to the NACA 63-4nn basis, namely a NACA 63-415, a NACA 63-416 and a NACA 63-417 airfoil. Even though the flow past the blade in general comprises three-dimensional flow effects each of the airfoil section is considered alone and modified using a two-dimensional approach.

In Table 1 co-ordinates of the three different aerodynamic devices are tabulated as x-co-ordinate and y-co-ordinate. As it is common practice, the co-ordinates are normalised by the chord-length of the airfoil. (The basic shape of the airfoil sections are standard NACA 63–415, 416 and 417 airfoil sections and co-ordinates of those are therefore not presented as these may be found in the literature).

TABLE 1

Co-ordinates of aerodynamic devices for NACA 63-415, 63-416 and 63-417 airfoils.

| 63-415 X | 63-415 Y | 63-416 X | 63-416 Y | 63-417 X | 63-417 Y |
|---|---|---|---|---|---|
| 0.135642 | −0.044608 | 0.101028 | −0.043183 | 0.090556 | −0.044150 |
| 0.123689 | −0.043393 | 0.090444 | −0.041761 | 0.080452 | −0.042597 |
| 0.112180 | −0.042208 | 0.080342 | −0.040385 | 0.070840 | −0.041126 |
| 0.101128 | −0.040993 | 0.070734 | −0.038977 | 0.061732 | −0.039640 |
| 0.090547 | −0.039715 | 0.061631 | −0.037519 | 0.053137 | −0.038084 |
| 0.080448 | −0.038408 | 0.053044 | −0.036045 | 0.045065 | −0.036522 |
| 0.070845 | −0.037078 | 0.044982 | −0.034558 | 0.037526 | −0.034952 |
| 0.061747 | −0.035727 | 0.037453 | −0.033000 | 0.030529 | −0.033288 |
| 0.053166 | −0.034323 | 0.030467 | −0.031406 | 0.024083 | −0.031624 |
| 0.045110 | −0.032881 | 0.024034 | −0.029800 | 0.018200 | −0.029974 |
| 0.037590 | −0.031415 | 0.018165 | −0.028188 | 0.012885 | −0.028226 |
| 0.030613 | −0.029927 | 0.012865 | −0.026492 | 0.008122 | −0.026490 |
| 0.024190 | −0.028386 | 0.008120 | −0.024808 | 0.003910 | −0.024780 |
| 0.018331 | −0.026796 | 0.003932 | −0.023139 | 0.000263 | −0.023038 |
| 0.013041 | −0.025197 | 0.000310 | −0.021500 | −0.002808 | −0.021168 |
| 0.008311 | −0.023601 | −0.002758 | −0.019679 | −0.005326 | −0.019259 |
| 0.004138 | −0.022022 | −0.005235 | −0.017791 | −0.007307 | −0.017361 |
| 0.000533 | −0.020385 | −0.007197 | −0.015882 | −0.008786 | −0.015187 |
| −0.002495 | −0.018693 | −0.008660 | −0.014016 | −0.009929 | −0.012606 |
| −0.004969 | −0.016939 | −0.009789 | −0.011653 | −0.010457 | −0.009082 |
| −0.006904 | −0.015153 | −0.010303 | −0.008828 | −0.010091 | −0.006434 |
| −0.008333 | −0.013291 | −0.009922 | −0.005496 | −0.008999 | −0.002781 |
| −0.009410 | −0.011027 | −0.008811 | −0.001784 | −0.007221 | 0.001536 |
| −0.009873 | −0.008240 | −0.007013 | 0.002433 | −0.004777 | 0.005779 |
| −0.009458 | −0.005356 | −0.004547 | 0.006438 | −0.001698 | 0.010178 |
| −0.008321 | −0.002018 | −0.001444 | 0.010552 | 0.002020 | 0.014796 |
| −0.006502 | 0.001868 | 0.002297 | 0.014855 | 0.006380 | 0.019499 |
| −0.004018 | 0.005670 | 0.006675 | 0.019247 | | |
| −0.000900 | 0.009622 | 0.011679 | 0.023519 | | |
| 0.002853 | 0.013780 | | | | |
| 0.007241 | 0.018112 | | | | |
| 0.012253 | 0.022414 | | | | |

Figure 2:
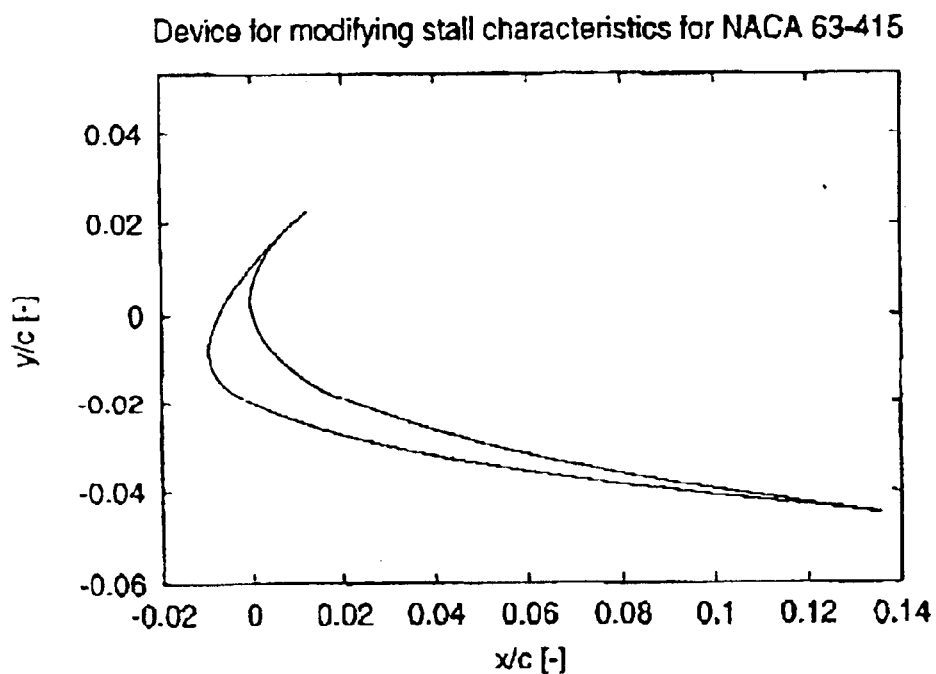
FIG. 2 shows an aerodynamic device to be mounted on the leading edge of a NACA 63-415 so that more stable stall characteristics are achieved. The device avoids double stall, i.e. it avoids jumps in lift and drag of the airfoil section.
Figure 3:
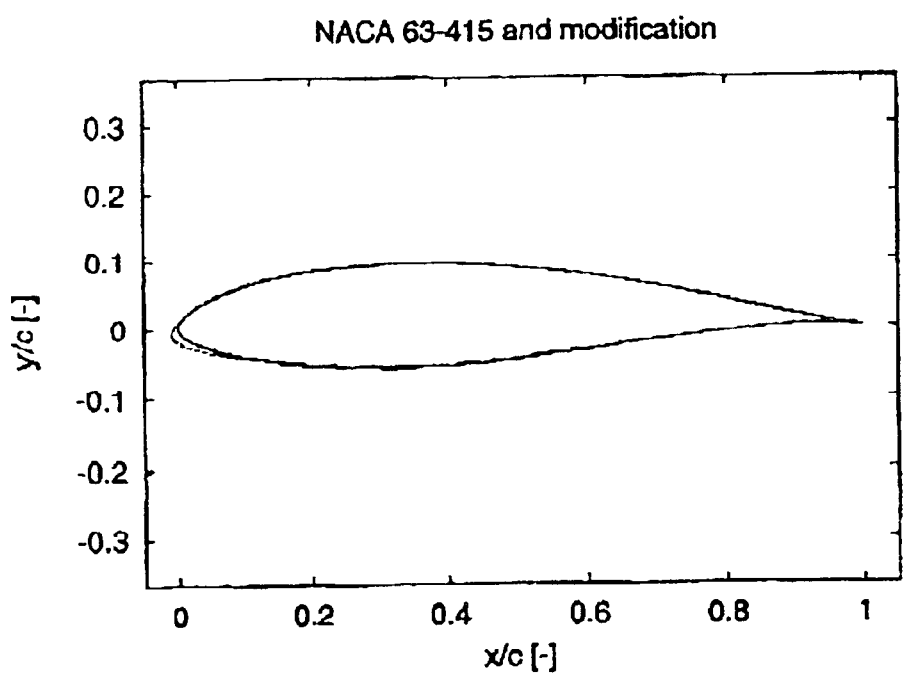
FIG. 3 shows by a solid line the NACA 63-415 airfoil section and by a dotted line the aerodynamic device.

The first aerodynamic device for NACA 63-415 tabulated in Table 1 is also depicted in FIG. 2 and 3 together with the non-modified airfoil section, so as to render the modification more visible.

It is quite interesting to see that the modification to be applied to the airfoil section is focused at the leading edge and the lower side of the airfoil section. One could be led to the conclusion that, as the problem with leading edge separation originate at the suction side of the airfoil section, the cure to the problem should also be focused here. But this is, as shown in this situation, not always the case.

As only three sections of the blade in the present example have been modified by the method according to the present invention, the remaining sections, i.e. the sections laying between the sections modified, of the blade also need to be modified. Several ways to modify these sections are provided by the method according to the present invention.

One way is to use an interpolation between the co-ordinates of the modified airfoil sections with respect to the distance between these two airfoil sections. Typically interpolations such a linear and cubic interpolations are used. In order to assure that the actual modified blade will not produce double stall, the sections, which result from the interpolations, may be controlled by the method according to the present invention, i.e. the positions of the transition points are evaluated. Furthermore, the modified total blade may be numerically evaluated in one or more full three-dimensional calculations.

Figure 4:
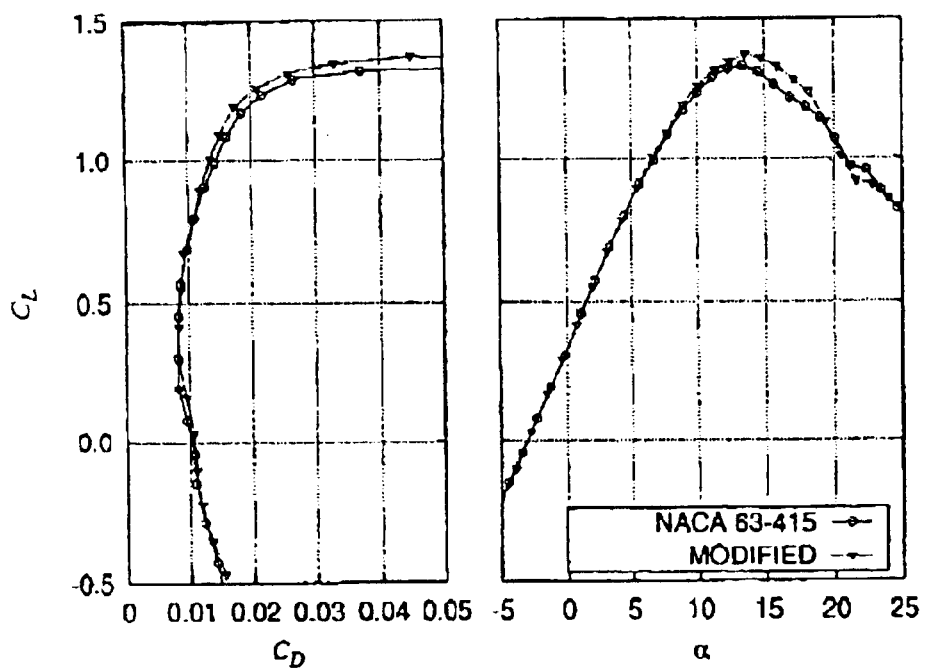
FIG. 4 shows the lift and drag for both the NACA 63-415 airfoil section and the modified NACA 63-415 airfoil section, where both airfoils have a smooth surface. The lift-drag ratio for the modified NACA 63-415 airfoil is increased. Measurements in the VELUX wind tunnel, Denmark, Reynolds number=$1.6 \times 10^6$.
Figure 5:
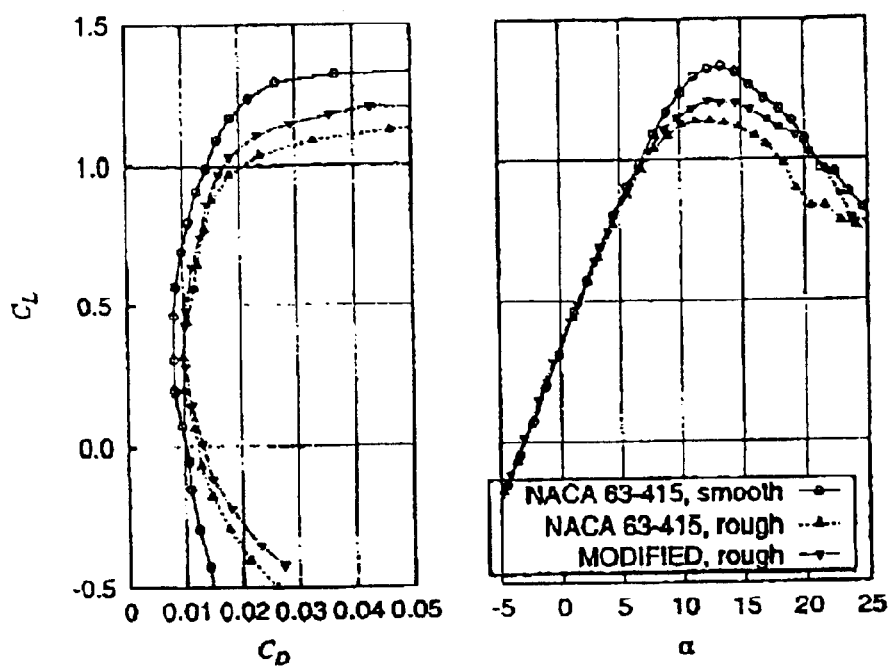
FIG. 5 shows the lift and drag for both the NACA 63-415 airfoil section and the modified NACA 63-415 airfoil section, where both airfoil sections have a leading edge roughness. The lift-drag ratio for modified NACA 63-415 airfoil section is increased. Measurements in the VELUX wind tunnel, Denmark, Reynolds number=$1.6 \times 10^5$.
Figure 6:
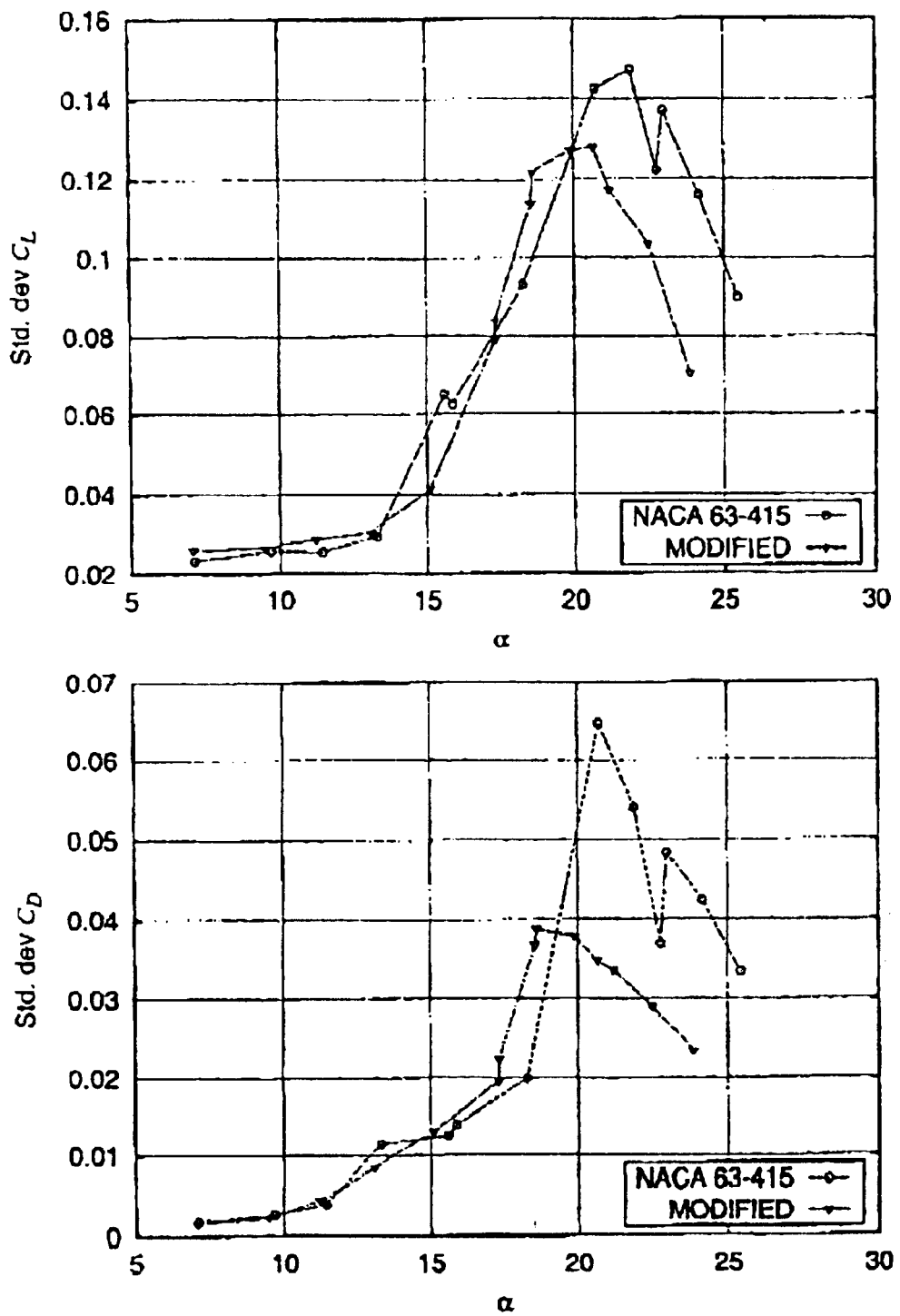
FIG. 6 shows the standard deviation for both the NACA 63-415 airfoil section and the modified NACA 63-415 airfoil section, where both airfoil sections have a smooth surface. The standard deviation in stall for the modified NACA 63-415 airfoil section is decreased. Measurements in the VELUX wind tunnel, Denmark, Reynolds number=$1.6 \times 10^5$.
Figure 7:
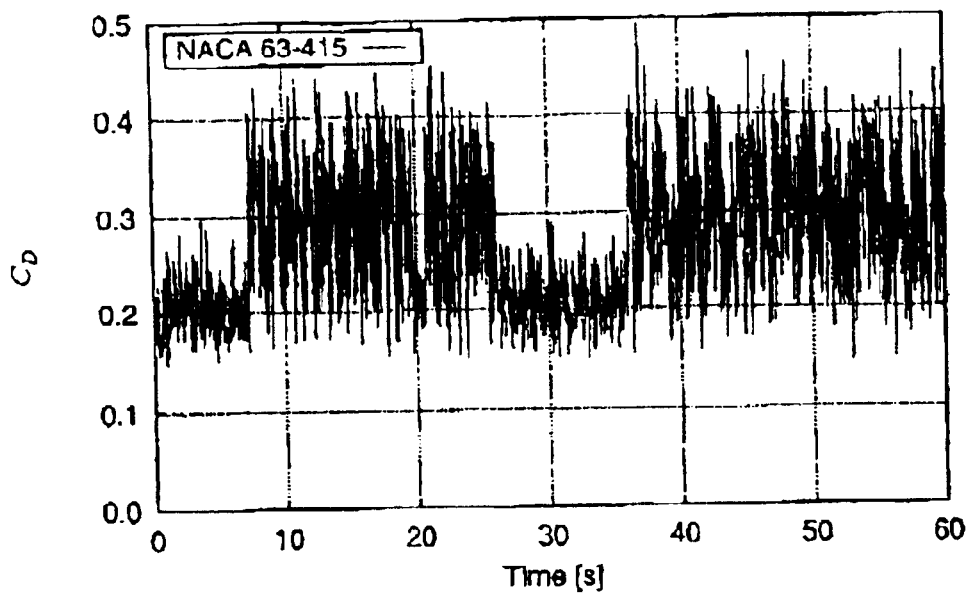
FIG. 7 shows a time series of the drag coefficient for the NACA 63-415 airfoil section with smooth surface. Sudden shifts in the drag coefficient are observed showing double stall.

Measurements on the NACA 63-415 airfoil and the modified airfoil show different improvements. As shown in FIG. 4 the lift-drag ratio measured as the lift coefficient CL divided by the drag coefficient $C_D$ just before stall and in stall is improved for an airfoil with smooth surface. In FIG. 5 the sensitivity to leading edge roughness is shown. It is seen that the modified airfoil with leading edge roughness on the pressure side has a minor reduction in maximum lift compared to the existing NACA 63-415 airfoil, while the existing NACA 63-415 airfoil with leading edge roughness has a severe reduction in maximum lift. An improvement of the variations of the aerodynamic loads are seen in FIG. 6, where especially the standard deviation of the drag has improved dramatically. The improvement is probably due to the avoidance of double stall which appeared on the NACA 63-415 airfoil shown in FIG. 7. Here two levels of the drag coefficient is seen for a fixed angle of attack of 20.7°.

MODIFIED NACA 63-2nn AIRFOILS

In the present example two different airfoils are considered which all belong to the NACA 63-2nn basis, namely a NACA 63-215 and a NACA 63-216 airfoil. Even though the flow past the blade in general comprises three-dimensional flow effects each of the airfoils is considered alone and modified using a two-dimensional approach.

In Table 2 co-ordinates of the two different aerodynamic devices are tabulated as x-co-ordinate and y-co-ordinate. As At is common practice, the co-ordinates are normalised by the chord-length of the airfoil. (The basic shape of the airfoils are standard NACA 63-215 and 216 airfoils and coordinates of those are therefore not presented as these may be found in the literature).

TABLE 2

Co-ordinates of aerodynamic devices for NACA 63-415, 63-416 and 63-417 airfoils.

| 63-215 X | 63-215 Y | 63-216 X | 63-216 Y |
|---|---|---|---|
| 0.112627 | −0.047403 | 0.101549 | −0.048604 |
| 0.101586 | −0.045625 | 0.090983 | −0.046532 |
| 0.091021 | −0.043887 | 0.080905 | −0.044591 |
| 0.080945 | −0.042089 | 0.071328 | −0.042656 |
| 0.071370 | −0.040238 | 0.062264 | −0.040670 |
| 0.062307 | −0.038317 | 0.053721 | −0.038610 |
| 0.053768 | −0.036350 | 0.045712 | −0.036489 |
| 0.045762 | −0.034339 | 0.038244 | −0.034332 |
| 0.038298 | −0.032291 | 0.031327 | −0.032150 |
| 0.031385 | −0.030217 | 0.024971 | −0.029958 |
| 0.025033 | −0.028128 | 0.019183 | −0.027778 |
| 0.019251 | −0.026045 | 0.013972 | −0.025633 |
| 0.014045 | −0.023989 | 0.009332 | −0.023469 |
| 0.009412 | −0.021917 | 0.005267 | −0.021231 |
| 0.005354 | −0.019771 | 0.001785 | −0.018922 |
| 0.001880 | −0.017545 | −0.001110 | −0.016586 |
| −0.001004 | −0.015282 | −0.003425 | −0.014273 |
| −0.003309 | −0.013028 | −0.005170 | −0.012061 |
| −0.005039 | −0.010811 | −0.006361 | −0.009652 |
| −0.006213 | −0.008666 | −0.007087 | −0.006797 |
| −0.006913 | −0.006032 | −0.007200 | −0.006274 |
| −0.007000 | −0.002987 | −0.006551 | −0.000535 |
| −0.006334 | 0.000367 | −0.005232 | 0.002997 |
| −0.005002 | 0.003575 | −0.003264 | 0.006352 |
| −0.003023 | 0.006705 | −0.000659 | 0.009856 |
| −0.000410 | 0.009926 | 0.002566 | 0.013463 |
| 0.002822 | 0.013219 | 0.006409 | 0.017186 |
| 0.006671 | 0.016580 | 0.010867 | 0.020989 |
| 0.011135 | 0.019990 | | |
| 0.016204 | 0.023446 | | |

Figure 8:
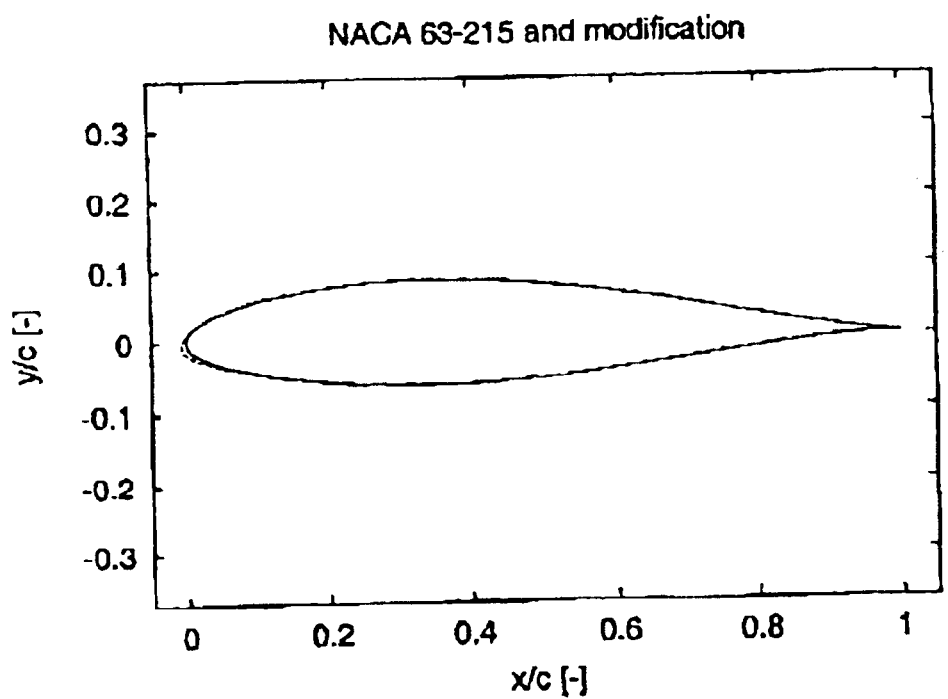
FIG. 8 shows by a solid line the NACA 63-215 airfoil section and by dotted line the aerodynamic device.

The first aerodynamic device for NACA 63-215 tabulated in Table 2 is also depicted in FIG. 8 together with the non-modified airfoil, so as to render the modification more visible.

It is quite interesting to see that the modification to be applied to the airfoil is focused at the leading edge and the lower side of the airfoil as it was the case with the modification of the NACA 63-415 airfoil. As for the modification of the NACA 63-415 airfoil one could be led to the conclusion that, as the problem with leading edge separation originate at the suction side of the airfoil, the cure to the problem should also be focused here. But this is, as shown in this situation, not always the case.

As only two sections of the blade in the present example have been modified by the method according to the present invention, the remaining sections, i.e. the sections laying between the sections modified, of the blade also need to be modified. Several ways to modify these sections are provided by the method according to the present invention.

One way is to use an interpolation between the co-ordinates of the modified airfoils with respect to the distance between these two airfoils. Typically interpolations such a linear and cubic interpolations are used. In order to assure that the actual modified blade will not produce double stall, the sections, which result from the interpolations, may be controlled by the method according to the present invention, i.e. the positions of the transition points are evaluated. Furthermore, the modified total blade may be numerically evaluated in one or more full three-dimensional calculations.

It should however be mentioned, that the method for designing airfoils according to the present invention may also make use of a full three-dimensional calculation, whereby the need for the interpolation etc. are avoided—the method may utilise three-dimensional calculations where three-dimensional effects may not be neglected and utilise two-dimensional calculation where the three-dimensional effects may be neglected and apply interpolation at the interface between these regions.

Implementation of the Modifications

In the following a description of implementation of the modifications according to the present invention is presented. Even though the modifications earlier are termed as a device, this should not be construed to only comprising a device which is to be attached to a wing, but also to comprise for instance a change of the blades geometry provided by adding or removing material to and/or from the blades in general. It is to be noted that it is the shape of the outer surface of the aerodynamic devices, i.e. the surface being contacted with the fluid, that provides the improved flow qualities. The interior of the devices may for instance preferably be made hollow in order to save weight.

The following items describe a non exhaustive list of preferred embodiments of implementation of modifications:

An aerodynamic device shaped as a rubber sheet having the outer form of the modifications—the modifications needed in order to modify a blade may be similitude so that compression and/or extraction of the rubber sheet having a basic modification shape may provide the correct modification.

An aerodynamic device provided by filling and/or adding material to the blades. This may preferably be provided by first providing islands of material giving the contour of the modification and secondly providing material filling the volume between the islands. The material is preferably a material which hardens after application.

An aerodynamic device provided by removal of material from the blades.

An aerodynamic device being prefabricated.

A two-dimensional aerodynamic device (for instance extruded) in a flexible (or plastic) material such as rubber or non-plastc material such as glass fibre, aluminium or steel.

Thus, the device geometry will be some average of the modifications for each of the selected airfoil sections.

Changes in the device producing the shape of the blade (for instance a mould) according to modifications. Thus, the modifications are no longer presented by devices, but by altering the geometry of new blades. This corresponds to a new airfoil design.

Device produced (for instance in a mould) to fit the original geometry of the blade having the outer form of the modifications. The material can be either an elastic material such as rubber or a non-elastic material such as glass fibre, aluminium or steel.

Device produced to fit the original geometry of the blade. A part of the leading edge part of the original blade is removed and the new device is mounted instead of the removed part of the blade. This ensures higher tolerances at the leading edge geometry. This kind of device also can be used for blades which is modified just to ensure higher tolerances for this geometry.

BRIEF EXPLANATION OF CERTAIN TERMS

In the present context a number of terms have been used. These terms are believed to be used in a manner not contradicting with the normal perception of the meaning of these terms. Anyhow, in order to avoid any misunderstandings brief explanations of some used terms are given below a blade is a three-dimensional structure an airfoil section is in general a cross section of a blade and is thereby a two-dimensional structure. Within the field of technology related to the present invention, said two-dimensional structure is often considered as a quasi two-dimensional structure in the sense that the extension of the structure normal to the cross section normally to is considered infinite. Thus, it is common practice to refer to the limiting contour of an airfoil section as a surface, for instance reference is often made to "the suction surface" or "suction side" of an airfoil section even though such section strictly speaking is only two-dimensional having no surface.

the term airfoil is used for short to indicate that both a blade and an airfoil section is considered.

airfoil flow is the flow past a blade or an airfoil section bursting of a leading edge separation bubble is a break down of a leading edge separation bubble and results in leading-edge stall before/after stall means for angles of attack below/above the angle of attack at which stall appears.

before/after maximum lift means for angles of attack below/above the angle of attack at which maximum lift appears.

smooth and continuous in connection with surfaces or contours exposed to a streaming fluid is preferably used to denote surfaces or contours being smooth and continues in fluid dynamical sense. When such surfaces are modelled or described by mathematical terms, it is often a mean surface or contour that is being modelled or described and in this case the smoothness and continuousness may preferably be quantified by first, second and optionally third derivatives being smooth and continues, preferably in mathematical sense. Thus, in all cases, bumps and edges are not expected on the airfoil section or blade if the contour or surface and its derivatives are continuous. Typically, when designing airfoil sections or blade, "smooth and continuos" is implemented as mathematical continuos, that is the airfoil section is per definition smooth, unless smoothness is modelled.

smooth airfoil or smooth blade means that no bugs, ice, dust or other kind of material which changes the roughness is accumulated on the surface. However, a smooth airfoil or smooth blade do not have to be hydraulically smooth in technical terms but as smooth as the manufacturing allows.

Efficiency of an airfoil or blade means for wind turbine use that the driving force is maximal. The driving force is the force acting in the rotor plane and tangential to the radius and drives the rotor. The lift-drag ratio is often used as a measure of the efficiency.

What is claimed is:

1. A modified wind turbine airfoil section comprising an airfoil section and a contour modification thereto, said modified airfoil section being characterised in that the first and the second derivative of the outer contour of the contour modification are substantially smooth and continuous.

2. A modified airfoil section according to claim 1, wherein the first and the second derivative of the contour of the modified airfoil section are substantially smooth and continuous, except at the trailing edge of the airfoil.

3. A modified airfoil section according to claim 1, wherein the angle between the suction surface and the chord line evaluated substantially 2% chord length behind the leading edge is larger than 32°.

4. A modified airfoil section according to claim 1, wherein the suction side free transition point is located upstream of the transition point which tricks bursting of a leading edge separation bubble.

5. A modified airfoil section according to claim 4, wherein the suction side free transition point is located more than 0.25% chord length upstream of the transition point which tricks bursting of a leading edge separation bubble being evaluated at angles of attack between 2° before and 4° after maximum lift.

6. A modified airfoil section according to claim 1, wherein the suction side free transition point is located less than 10% chord length, preferably less than 8.5% chord length, such as less than 7% chord length from the leading edge being evaluated at angles of attack between 6° before and 6° after maximum lift.

7. A modified airfoil section according to claim 1, wherein the modified airfoil section has a lift-drag ratio being higher than the airfoil without the contour modification, said lift drag-ratio being evaluated in an interval ranging from 8 degrees angles of attack before stall to maximum lift.

8. A modified airfoil section according to claim 7, wherein the lift-drag ratio of the modified airfoil section has a lift drag ratio being larger than 20, said lift drag-ratio being evaluated in an interval ranging from 5 degrees angles of attack before stall to maximum lift.

9. A modified airfoil section according to claim 1, wherein normalised minimum edgewise damping, $c_x$, is greater than −2 and wherein the normalised minimum flapwise damping, $c_y$, is greater than −6.

10. A modified blade for a wind turbine having at least one modified airfoil section according to claim 1.

11. A modified blade for a wind turbine according to claim 10, wherein the contour modification is provided by an aerodynamic device mounted on a blade.

12. A modified blade for a wind turbine according to claim 11, wherein the aerodynamic device is shaped so that once mounted on a blade, the surface at least in the vicinity of the intersections between the device and the blade are smooth and continuous.

13. A modified blade for a wind turbine according to claim 11, wherein the aerodynamic device is shaped so that once mounted on a blade, the tangent to the surfaces in the vicinity of the intersection(s) between the aerodynamic device and the blade is(are) smooth and continuous.

14. A modified blade for a wind turbine according to claim 11, wherein the aerodynamic device modifies a blade only the leading edge region or modifies substantially only the leading edge region of a blade.

15. A modified blade for a wind turbine according to claim 11, wherein the blade on which the aerodynamic device is mounted is a blade having an inclination towards leading edge laminar separation at an angle of attack between 5° before maximum lift and 8° after maximum lift.

16. A modified blade for a wind turbine according to claim 10, wherein the contour modification or aerodynamic device is provided by adding material to a blade.

17. A modified blade for a wind turbine according to claim 10, wherein the modification and/or aerodynamic device is/are made as a flexible sheet having the form of the modification and/or aerodynamic device.

18. A modified blade according to claim 10, wherein the contour modification or aerodynamic device is made as a flexible sheet being substantially uniform in one direction, so that the modifications needed in order to modify a blade is provided by compression and/or extraction of the flexible sheet.

19. A modified blade according to claim 10, wherein the contour modification or aerodynamic device is made as an pre-fabricated device to be attached to a blade.

20. A blade according to claim 10, wherein the contour modification or the aerodynamic device is pre-fabricated by extruding in a flexible material, whereby the device geometry will be some average of the modifications for each of the selected airfoil sections.

21. A modified blade for a wind turbine having at least one modified airfoil section according to claim 1 so that bursting of a leading edge laminar separation bubble is avoided in at least the vicinity of the at least one airfoil section.

22. A method of modifying by use of a computer system the shape of a blade or an airfoil section, in which method a design set-up has been provided in terms of an objective function to be minimised representing the negative efficiency of the airfoil section or blade at least at one angle of attack, design variables representing points on at least a part of the airfoil section or of the blade, geometrical constraint(s) stipulating that each geometrical modification to the airfoil section or to the blade determined by the method must be so that the first and the second derivative of the airfoil section contour or blade contour in at least in the vicinity of the intersection between the modification of the airfoil section or the blade and the non-modified part of the airfoil section of blade are substantially smooth and continuous, aerodynamically constraint(s) which method comprising the steps of a) providing an initial shape of the airfoil section or blade, b) simulating a number of flows past the airfoil section or blade necessary to evaluate the aerodynamically constraints, c) and if the aerodynamically constraints is not fulfilled then the initial shape of the airfoil section or blade is modified by modifying the design variables based on minimisation of the objective function and respecting geometrical constraints, thereby providing a new shape of the airfoil section or blade, and repeating steps b) and c) based on the new shape of the airfoil until the objective function is minimised thereby providing a modified airfoil.

23. A method according to claim 22, wherein the geometrical constraint(s) stipulates or further stipulates that each geometrical modification to the airfoil section or to the blade determined by the method must have substantially smooth and continuous first, second and second derivatives.

24. A method according to claim 22, wherein the geometrical constraint(s) stipulates or further stipulates that the contour of the modified airfoil section or the contour of the modified blade determined by the method must have substantially smooth and continuous, first and second derivatives except at the trailing edge.

25. A method according to claim 22, wherein the aerodynamically constraint(s) stipulates or further stipulates that the free transition point is located upstream of the transition point that tricks bursting of a leading edge separation bubble.

26. A method according to claim 25, wherein the aerodynamically constraint(s) stipulates that the free transition point is to be located more than 0.25% chord length upstream of the transition point which trick bursting of a leading edge separation bubble evaluated at angles of attack between 2° before and 4° after maximum lift.

27. A method according to claim 22, wherein the aerodynamically constraint(s) stipulates or further stipulates attached suction side flow.

28. A method according to claim 22, wherein the aerodynamically constraint(s) is(are) expressed in terms of geometrical constraint(s) as the angle between the suction surface and the chord line evaluated at substantially 2% chord length behind the leading edge to be larger than 32°.

29. A method according to claim 22, wherein the objective function stipulates or further stipulates maximisation of the efficiency.

30. A method according to claim 22, wherein aerodynamic constraint(s) stipulates or further stipulates that the suction side free transition point must be located less than 10% chord length from the leading edge being evaluated at angles of attack between 6° before and 6° after maximum lift.

31. A method according to claim 30, wherein the objective function stipulates or further stipulates maximisation of the lift-drag-ratio between 2° and 10° degrees angles of attack.

32. A method according to claim 22, wherein the objective function stipulates or further stipulates maximisation of the lift-drag-ratio between 8° and 12° degrees angles of attack.

33. A method according to claim 22, wherein aerodynamically constraint(s) is(are) expressed in terms of geometrical constraint(s) as the angle between the suction surface and the chord line evaluated substantially 2% chord length behind the leading edge must be larger than 32°.

34. A method according to claim 33, wherein the aerodynamically constraint(s) stipulates or further stipulates that the free transition point is located downstream of the transition point that tricks bursting of a leading edge separation bubble.

35. A method according to claim 34, wherein the aerodynamically constraint(s) stipulates or further stipulates that the free transition point, is located more than 0.25% chord length upstream of the transition point which would trick bursting of a leading edge separation bubble evaluated at angles of attack between 2° before and 4° after maximum lift.

36. A method according to claim 33, wherein the objective function stipulates maximisation of lift-drag-ratio between the angles of attack showing zero lift and maximum lift.

37. A method according to claim 22, wherein the aerodynamic constraint(s) stipulates or further stipulates that the normalised minimum edgewise damping, $c_x$, should be greater than −2, and wherein the normalised minimum flapwise damping, $c_y$, should be greater than −6.

38. A method according to claim 37, wherein the objective function stipulates or further stipulates maximisation of lift-drag-ratio between 2° and 10° degrees angles of attack.

* * * * *